United States Patent [19]

Strong et al.

[11] Patent Number: 4,982,830

[45] Date of Patent: Jan. 8, 1991

[54] PRODUCT FEEDING APPARATUS

[75] Inventors: Michael D. Strong, Mechanicsburg; Charles E. Zimmerman, Birdsboro; Michael G. Kiapokas, Lancaster, all of Pa.

[73] Assignee: AMP Incorporated, Harrisburg, Pa.

[21] Appl. No.: 423,479

[22] Filed: Oct. 18, 1989

[51] Int. Cl.[5] ............ B65G 37/00

[52] U.S. Cl. ............ 198/349.6; 198/349.7; 29/749

[58] Field of Search ............ 29/749, 753, 759; 198/349.6, 349.7, 357, 360, 370

[56] References Cited

U.S. PATENT DOCUMENTS

| | | | |
|---|---|---|---|
| 2,728,466 | 12/1955 | Postlewaite et al. | 198/349.7 X |
| 2,936,081 | 5/1960 | Peras | 198/349.7 X |
| 2,966,251 | 12/1960 | Nussbaum | 198/366 X |
| 4,043,034 | 8/1977 | Sucheski et al. | 29/749 |
| 4,380,117 | 4/1983 | Brandewie et al. | 29/743 |
| 4,458,412 | 7/1984 | Dean et al. | 29/705 |
| 4,480,738 | 11/1984 | Mattson | 198/339 |
| 4,564,102 | 1/1986 | Mori et al. | 198/349.7 X |
| 4,570,321 | 2/1986 | Meyer et al. | 29/566.3 |
| 4,633,570 | 1/1987 | Burgit et al. | 29/564.4 |
| 4,682,391 | 1/1987 | Hall, Jr. et al. | 29/33 M |
| 4,888,867 | 12/1989 | Maack et al. | 29/861 X |

*Primary Examiner*—H. Grant Skaggs
*Assistant Examiner*—James R. Bidwell
*Attorney, Agent, or Firm*—James M. Trygg

[57] ABSTRACT

A connector feeding apparatus for an automated cable making machine is disclosed. The apparatus includes a pair of carousels each of which has a series of connector receiving units disposed about its periphery. Each carousel has a group of connector dispensing units arranged for selectively dispensing different types of connectors, under computer control, and inserting them into the connector receiving units. The carousels then deliver the connectors, in a desired order and a desired orientation to staging modules which, again under computer control, direct the connectors to a terminating station within the machine.

7 Claims, 9 Drawing Sheets

BEST AVAILABLE COPY

BEST AVAILABLE COPY

BEST AVAILABLE COPY

BEST AVAILABLE COPY

BEST AVAILABLE COPY

PRODUCT FEEDING APPARATUS

The present invention relates to a product feeding apparatus in a machine for making electrical cable assemblies. The apparatus feeds a plurality of products such as connectors of selected types in a desired order for both the leading and trailing ends of the cable assembly.

BACKGROUND OF THE INVENTION

Automated machines for making electrical cable assemblies are generally arranged to fabricate a given quantity of identical cable assemblies. During the fabrication, the conductors are cut to length and presented to a connector termination station for termination to a desired connector. The connector termination stations each include a connector storage and dispensing unit for dispensing a given type of connector, each such unit containing only one type of connector. By way of example, U.S. Pat. No. 4,043,034, which issued Aug. 23, 1977 to Sucheski, et al. discloses a connector storage and dispensing apparatus which receives individual connectors from a reel of tape fed connectors. The individual connectors are loaded into a vertically disposed tray or guide track. A single connector at the bottom of the guide track is presented to a pick up mechanism for transfer to the termination station. Another similar connector dispensing mechanism is disclosed in U.S. Pat. application Ser. No. 132,310 filed Dec. 15, 1987 having Docket No. 13795 and assigned to the present assignee. There, a pair of vertical guide tracks are arranged to dispense connectors in two different orientations, one being in the opposite direction of the other. A shuttle, which can hold up to four connectors is passed adjacent the two guide tracks to receive up to four connectors. The shuttle is then positioned adjacent a series of four connector holders and the connectors simultaneously pushed laterally into the holders. The holders are then indexed, one at a time, to the terminating press for terminating the cable to each connector. With this arrangement, the ordering of the two different connector orientations must be determined in advance and the shuttle manually configured to accept this ordering. The four connector holders must also be manually configured to correspond to this ordering. This, of course, precludes use in a fully automated environment where cable assemblies having different connectors terminated thereto can be selectively and automatically fabricated. Additionally there is no capability to fabricate a repetitive series of different cable assemblies such as identical kits of cable assemblies.

The present invention teaches novel apparatus and methods of making such kits of cable assemblies in an automated environment.

SUMMARY OF THE INVENTION

The present invention is directed to a connector feeding apparatus and method for automatically selecting and feeding a series of connectors in ordered relationship corresponding to a preselected order of fabrication of a plurality of different cable assemblies in an automated environment. The connector feeding apparatus includes a plurality of connector dispensing units in ordered spaced relationship wherein one of the dispensing units contains connectors of one type and another dispensing unit contains connectors of a second type. A conveyer means is provided having a plurality of connector receiving units arranged for relative movement with respect to the dispensing units so that each receiving unit periodically dwells at a position of registration with each dispensing unit. There is a means for associating the ordered relationship of connectors with the receiving units so that each receiving unit is identified as to which type of connector it is to receive. A means is provided for selectively actuating each dispensing means for moving a connector therefrom into a connector receiving means only when the receiving means is in its position of registration with the dispensing means having the desired type of connector.

DESCRIPTION OF THE PREFERRED EMBODIMENT

Figure 1:
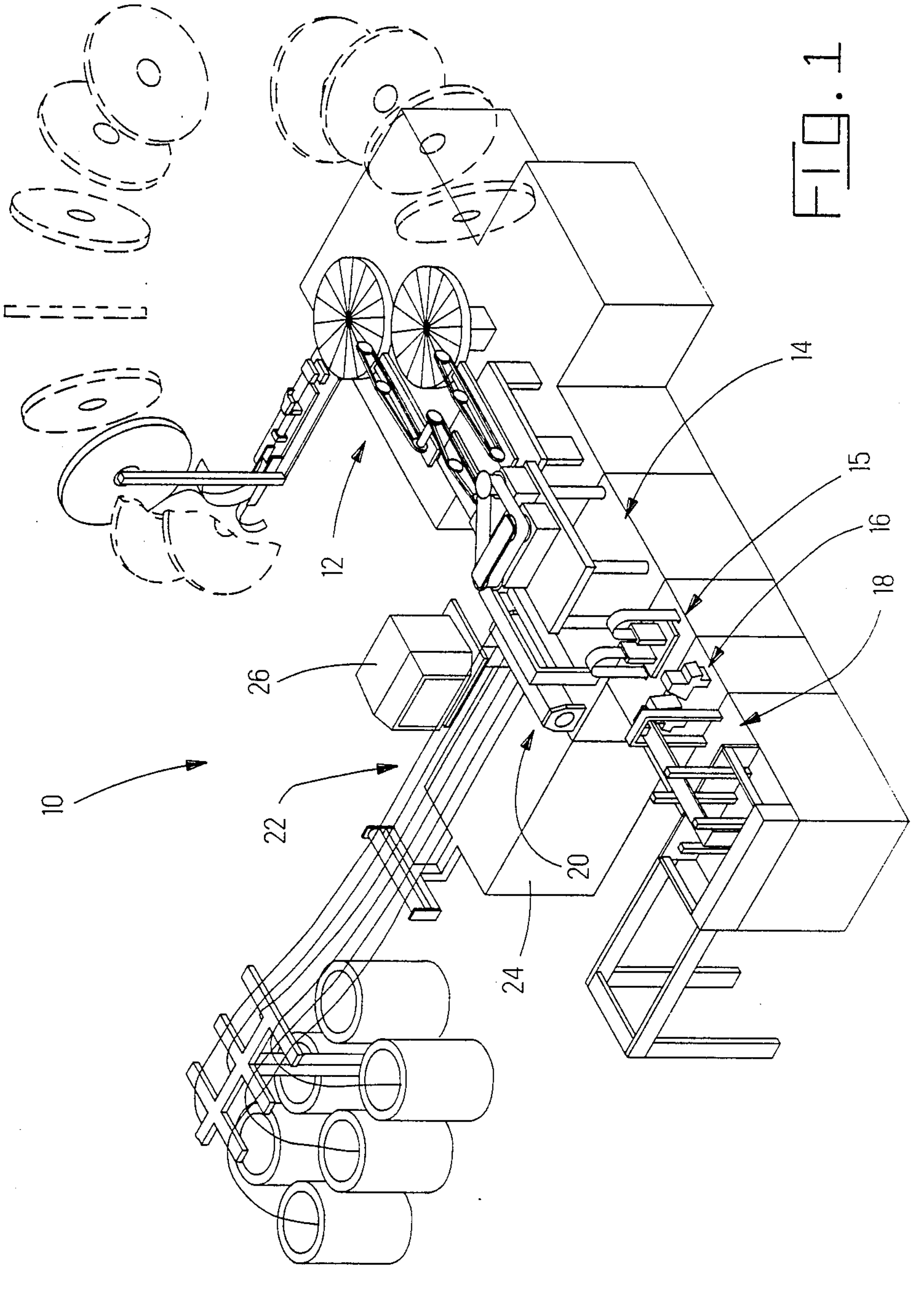
FIG. 1 is an isometric view of an automated cable making machine incorporating the teachings of the present invention.

There is shown in FIG. 1 an automated cable making machine 10 having a connector feeding apparatus 12, a wire terminating station 14, a quality check station 15, a connector marking station 16, a cable management and packaging station 18, a wire feed and measurement station 20, and a computerized control station 22 for controlling the operation of the machine 10. The machine 10 is designed to manufacture a desired quantity of kits of cable assemblies automatically and to physically arrange each kit in a separate package. Since the present invention relates to the connector feeding apparatus 12, that apparatus will be described in more detail during the following discussion of the machine 10.

The general operation of the machine involves establishing an initial data base which is maintained by a computer 24, defining the various parameters of the cable assemblies to be made, the type and location of the various types of connectors to be used during fabrication, and other parameters defining various aspects of the specific configuration of the machine 10 and its operation. Very briefly, an operator will input into the computer 24, by means of a terminal 26, information identifying the cable assemblies to be made, the quantity of each that form a kit and the quantity of kits to be made. The computer then can manipulate the connector feeding apparatus 12 to select and deliver the desired type and quantity of connectors in the correct order for termination to the leading and trailing ends of the cable assemblies comprising each kit.

Figure 2:
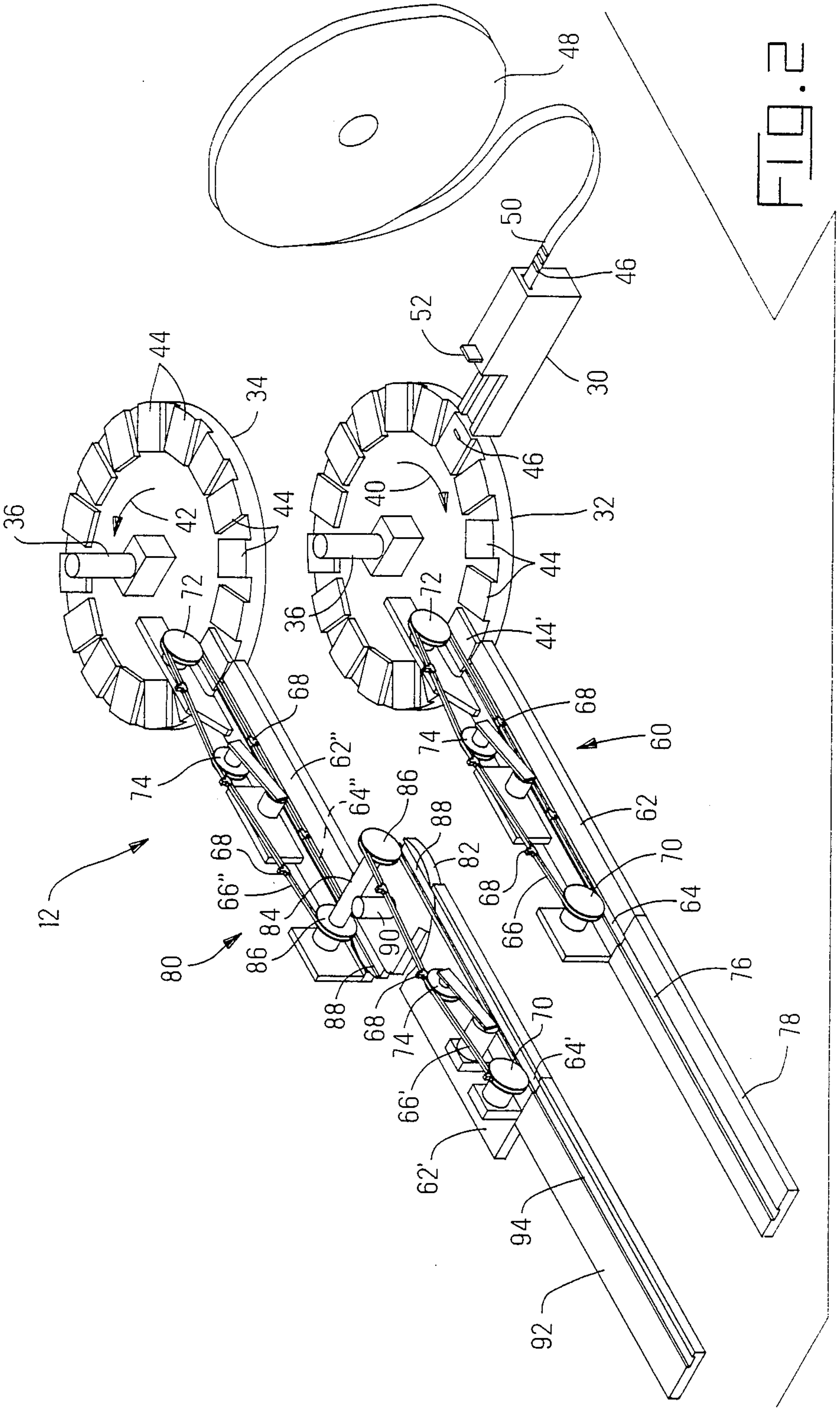
FIG. 2 is an isometric view of the connector feeding apparatus shown in FIG. 1.
Figure 3:
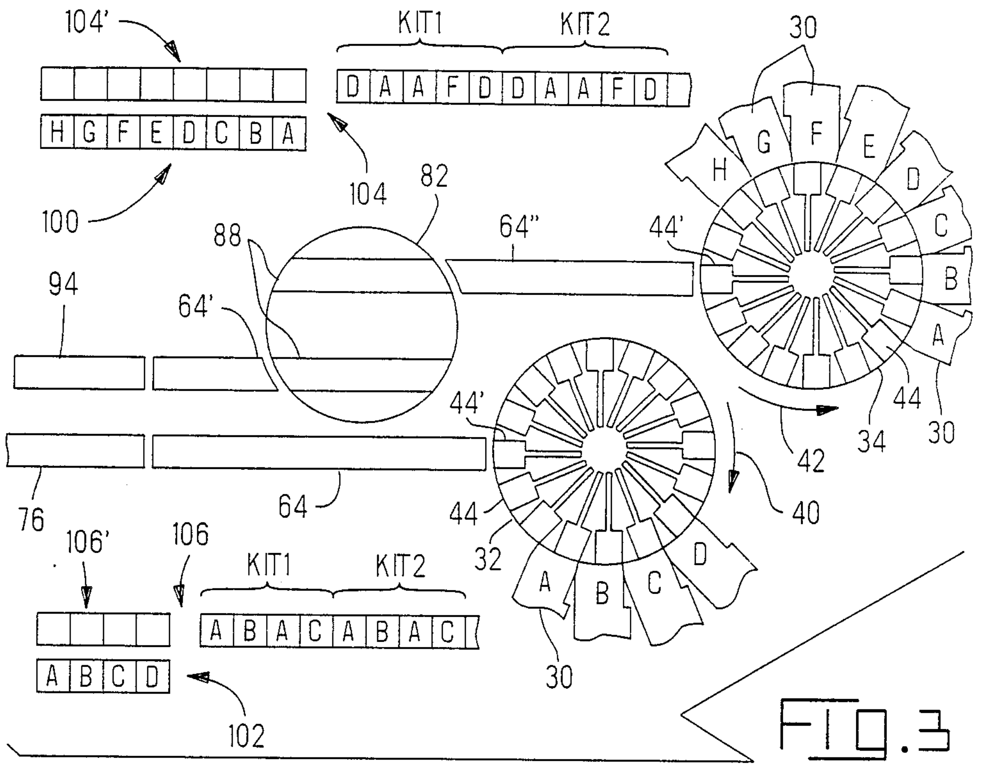
FIGS. 3 through 15 are schematic representations of the connector feeding apparatus of FIG. 2 showing its operation.

The major elements of the connector feeding apparatus 12, see FIGS. 2 and 3 include a series of 4 connector dispensing units 30 arranged adjacent a leading end carousel 32 and another series of 8 connector dispensing units 30 arranged adjacent a trailing end carousel 34. Each carousel 32 and 34 includes a drive shaft 36 journaled in the machine 10 for rotation of the carousels in the directions indicated by the arrows 40 and 42 respectively. The drive shafts 36 are coupled to and their motion synchronized with the motions of the other moving elements of the machine 10 to effect the operation as will be described below.

Each carousel 32 and 34 contains a plurality of connector receiving units 44 arranged about the periphery thereof for receiving and carrying individual connectors 46 that are dispensed by the connector dispensing units 30. The connectors 46 are provided by a supply reel 48 and are arranged in a continuous strip 50 of metal which forms part of the lead frame of each connector in a manner that is well known in the art. Each connector dispensing unit 30 includes a shear 52, which when activated upon command of the computer 24, will shear the strip 50 thereby providing a single connector for the dispensing unit 30 to transfer to the adjacent connector receiving unit 44. Transfer of the connector 46 is done by an air cylinder actuated push rod, not shown, which is controlled by the computer 24. The connector receiving units 44 are spaced about the periphery of the carousels 32 and 34 so that they correspond to the spacing of the adjacent connector dispensing units 30. The movement of the carousels 32 and 34 provides a dwell when the connector receiving units 44 are in registration with corresponding connector dispensing units 30 so that individual connectors 46 may be transferred. The carousels 32 and 34 thereby undergo intermittent motion where each connector receiving unit 44 is momentarily stopped adjacent to and in registry with each connector dispensing unit 30 in turn. This motion may be provided by a geneva motion mechanism or any suitable mechanism well known in the art.

A connector take-off module 60, including a base 62 having a track 64, is positioned adjacent the leading end carousel 32 as shown in FIG. 2. The module 60 is positioned so that when the carousel 32 is in a dwell position, the connector receiving unit 44' is in registry with the track 64 so that a connector 46 may be transferred from the unit 44' into the track 64. A conveyor chain 66 having fingers 68 is disposed about a drive pulley 70, an idler pulley 72 and a slack take-up pulley 74. The chain 66 is positioned directly over the track 64 so that the fingers 68 will engage a connector 46 that is in the connector receiving unit 44' and move it into and along the track 64 and finally into a staging track 76 formed in a leading end staging module 78. The staging module 78 included a pusher mechanism, not shown, for pushing connectors 46 into position in the wire terminating station 14 for terminating to the leading end of the cable under the control of the computer 24.

Another connector take-off module 80 is positioned adjacent the trailing end carousel 34 as shown in FIG. 2. The module 80 is similar to the module 60 in that similar elements have similar identifying numbers. The difference between the two modules is that the module 80 includes two bases 62' and 62" separated by a turntable 82, and two chains, 66' and 66", one for each base 62' and 62" respectively. Each base 62', 62" includes a track 64', 64" through which the connectors 46 may be moved by the fingers 68 in a manner similar to that of the module 60. The two chains 66' and 66" are drivingly joined over the turntable 82 by a rotatable coupling shaft 84 having a pulley 86 rigidly attached to each end. Thus, as the drive pulley 70 is rotated causing the chain 66' to rotate the first pulley 86 which in turn causes the other pulley 86 to drive the chain 66" by means of the coupling shaft 84. The turntable 82 includes a pair of tracks 88, one of which is directly under and in alignment with the chain 66' and the other of which is under and in alignment with the chain 66'". The turntable 82 is rotatable about the shaft 90 selectively to either of two positions. In one such position one track 88 is in registry with the track 64' of the base 62' and the other track 88 is in registry with the track 64" of the base 62". In the other such position the two tracks 88 are reversed. The purpose of the turntable 82 is to turn the trailing end connectors 46 so that when in the track 64' of the base 62' they are properly oriented for termination to the trailing end of the cable. A trailing end staging module 92 similar to the leading end staging module 78 includes a staging track 94 in alignment with the track 64' of the base 62'. The staging module 92 includes a pusher mechanism, not shown, for pushing connectors 46 into position in the wire terminating station 14 for termination to the trailing end of the cable under the control of the computer 24.

FIGS. 3 through 13 show, by way of example, the detail operation of the connector feeding apparatus 12. Each figure schematically represents the two carousels 32 and 34, the connector dispensing units 30, the connector receiving units 44, the tracks 64, 64', 64", and 88, the turntable 82, and the two staging modules 76 and 94. The computer 24 includes in memory a first array 100 having a character position corresponding to each connector dispensing unit 30 associated with the trailing end carousel 34 and a second array 102 having a character position corresponding to each unit 30 associated with the leading end carousel 32. The term "character position" used herein means a logical grouping of memory units that identifies, or that contain an identifier that corresponds to, a specific type of connector contained in a connector dispensing unit 30. For purposes of illustration, the letters of the alphabet will be used as identifiers so that each connector dispensing unit 30 will have a single letter associated therewith which is indicative of the type of connector contained therein. For example, as seen in FIG. 3, the four leading end connector dispensing units 30 have, from left to right, identifiers A, B, C, and D while the trailing end connector dispensing units 30 have the identifiers H, G, F, E, D, C, B, and A. Correspondingly, the two arrays 100 and 102 contain, from left to right, the same identifiers as their respective trailing and leading end connector dispensing units 30. Thus, the identifiers A, B, C, and D of the array 102 correspond to the identifiers A, B, C, and D of the leading end connector dispensing units 30, as shown in FIG. 3, and the identifiers of the array 100 correspond to the identifiers of the trailing end connector dispensing units 30.

The computer 24 also includes in memory two shift registers, a trailing end shift register 104 and a leading end shift register 106 each of which contains sufficient character positions to accommodate identifiers for the maximum number of connectors that are to be terminated to the trailing and leading ends respectively of the cable.

To illustrate and describe the operation of the connector feeding apparatus 12 a typical kit of two cable assemblies is shown in Table 1.

TABLE 1

| Kit No. | Cable No. | LE | TE |
|---|---|---|---|
| 1 | 1 | A | A |
| | | B | D |
| | 2 | A | D |
| | | C | F |
| | | | A |

The leading end (LE) of the first cable assembly includes a connector having the identifier A and one having the identifier B while the trailing end (TE) includes the connectors A and D. The second cable assembly includes the connectors A and C on the leading end and the connectors D, F, and A on the trailing end. The order of the connector indicators in Table 1 is the order in which the corresponding connectors are to be terminated to their respective cable assembly. As shown, cable numbers 1 and 2 comprise the first kit. The cable making machine 10, utilizing the teachings of the present invention is designed to produce any number of first kits containing the two cable assemblies as well as other kits containing different cable assemblies. For purposes of this discussion, however, the description of the operation of the connector feeding apparatus 12 will be limited to processing two first kits.

Figure 13:
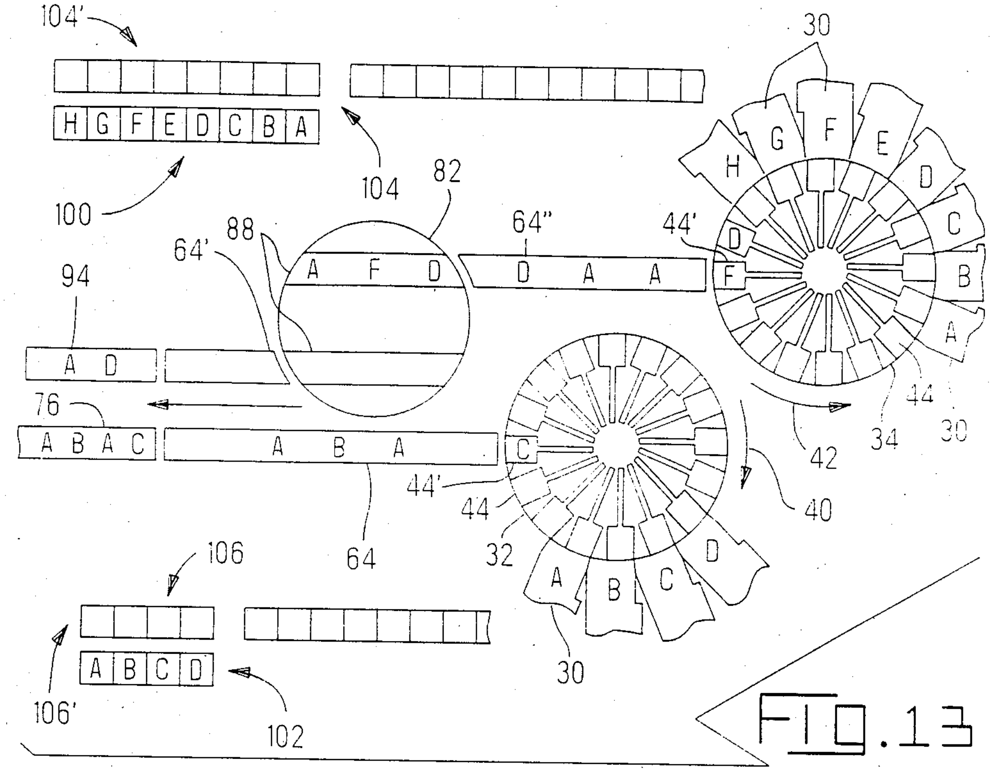
Figure 14:
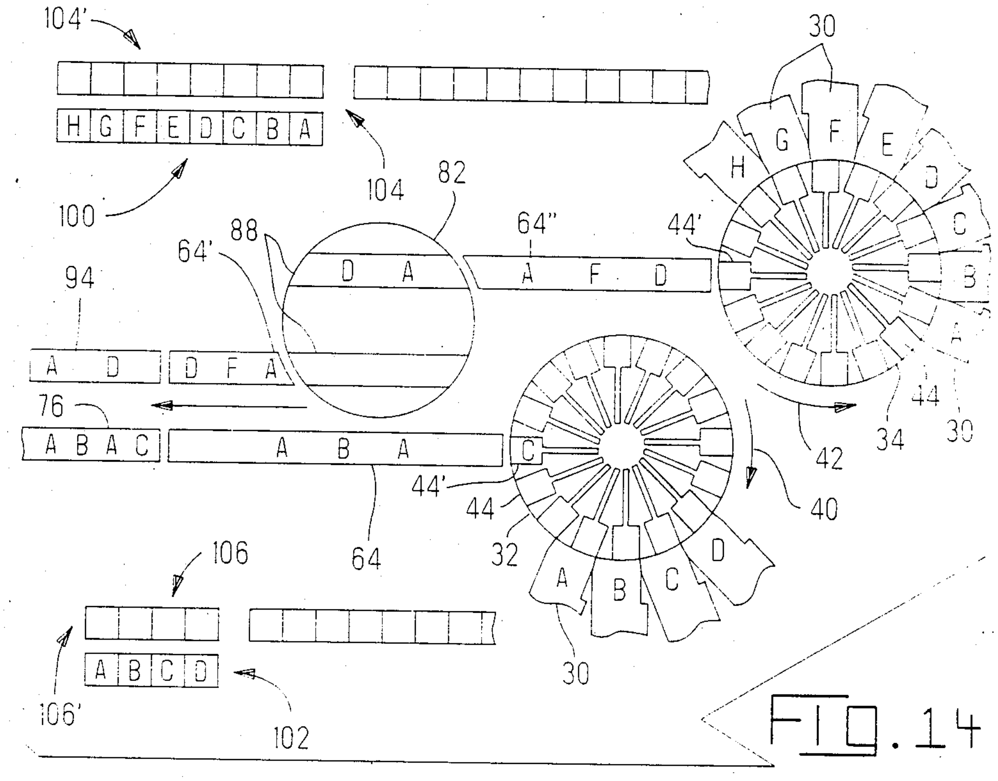

The goal of the following procedure is to place the indicated type of connectors in the order shown in Table 1 into the staging modules 76 and 94 as best seen in FIG. 13. Note that the module 94 contains only the first kit while the second kit is still in the turntable 82. The next machine cycle would shift the second kit of connectors to the module 94.

To begin, the indicators for the leading end of each cable for both the first and second kits are placed into the shift register 106 in order from left to right, as viewed in FIG. 3. Similarly, the indicators for the trailing end of each cable for both kits are placed into the shift register 104 in order from left to right however, the connectors for each cable are in reverse order as shown. A portion 104' of the shift register 104 having no indicators is shown, in FIG. 3, directly above and in character position alignment with the array 100. This positioning is for illustrative purposes only and is not indicative of physical location within the memory of the computer 24. Similarly, a portion 106' of the shift register 106 having no indicators is shown directly above and in character position alignment with the array 102.

Figure 4:
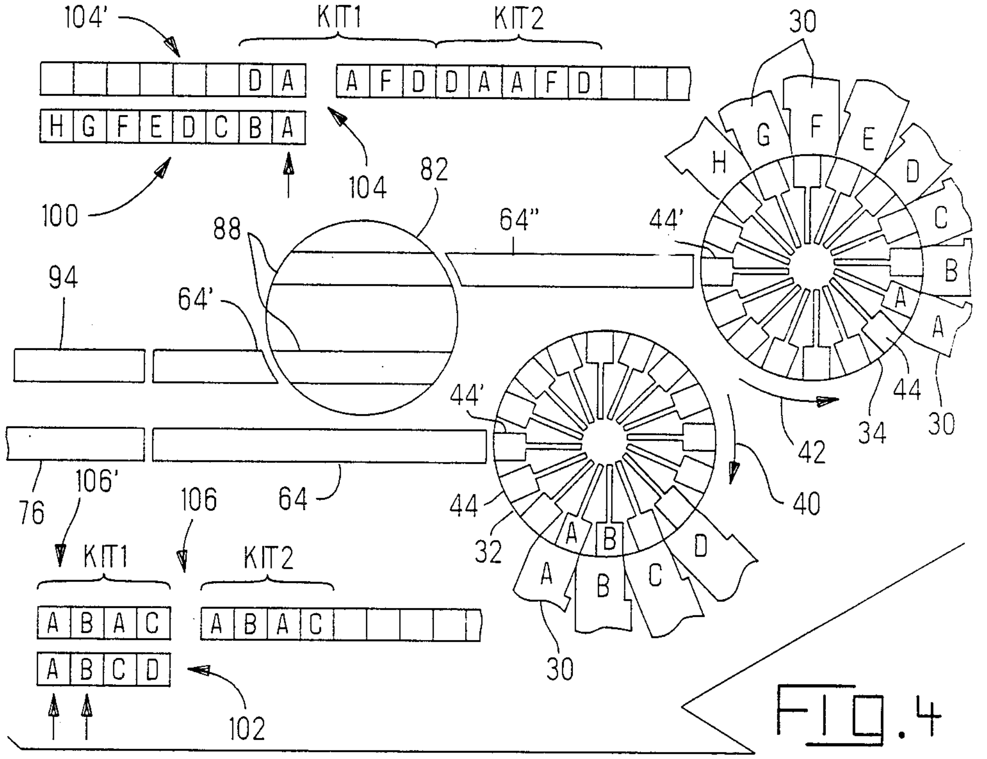

The machine 10 is cycled causing the carousels 32 and 34 to index in the direction of the arrows 40 and 42 respectively. Simultaneously, the indicators in the shift register 104 are caused to shift to the left into the portion 104' a number of positions until an indicator in the portion 104' is in alignment with an identical indicator in the array 100, as shown in FIG. 4. In the present example, a two position shift was required. This match of identical indicators is indicated in the figures as a vertical arrow. Note that the right most position of the array 100 and the portion 104, both contain an A indicator. Because both contain an A indicator, the connector dispensing unit 30 containing A type connectors is actuated by the computer 24 to place an A type connector in the adjacent connector receiving unit 44 of the trailing end carousel 34.

Concurrently, the indicators in the shift register 106 are caused to shift to the left into the portion 106' a number of positions until an indicator in the portion 106' is in alignment with an identical indicator in the array 102. In the present example, as shown in FIG. 4, four position shifts were required. However, in this case two positions of the array 102 contain identifiers identical to those of corresponding positions of the portion 106' as indicated by the two vertical arrows. In this case the connector dispensing units 30 containing A and B type connectors are actuated by the computer 24 to place an A type connector and a B type connector in adjacent connector receiving units 44 of the leading end carousel 32, as shown in FIG. 4.

Figure 5:
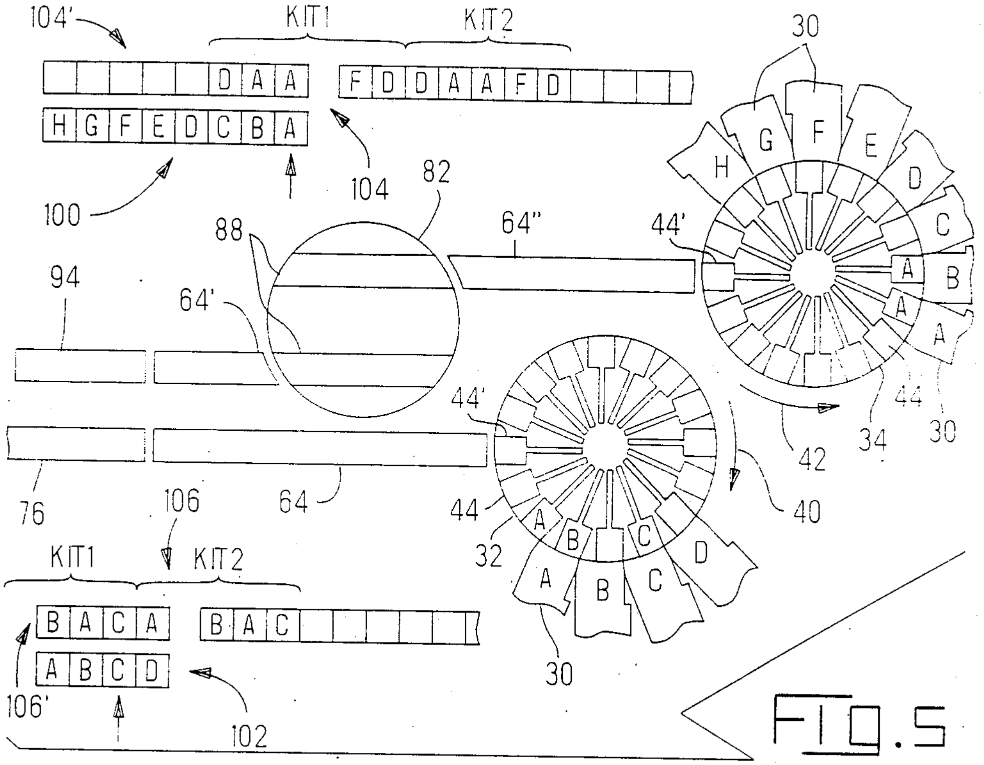

The machine 10 is then cycled again causing the carousels 32 and 34 to index in the direction of the arrows 40 and 42 respectively. Simultaneously, the indicators in the shift registers 104 and 106 are again caused to shift to the left into the portions 104' and 106' respectively, a number of positions until another indicator in each of the portions 104' and 106' is in alignment with an identical indicator in the arrays 100 and 102 respectively. See FIG. 5. In this case the indicators of the shift register 104 shifted only one position to the left and the carousel 34 also indexed one position in the direction of the arrow 42, while the indicators of the shift register 106 also shifted only one position to the left and the carousel 32 indexed one position in the direction of the arrow 40. As shown in FIG. 5, the A indicators match for the trailing end causing an A type connector to be placed in the adjacent connector receiving unit 44 of the trailing end carousel 34. Similarly, the C indicators match for the leading end causing a C type connector to be placed in the adjacent connector receiving unit 44 of the leading end carousel 32.

Figure 6:
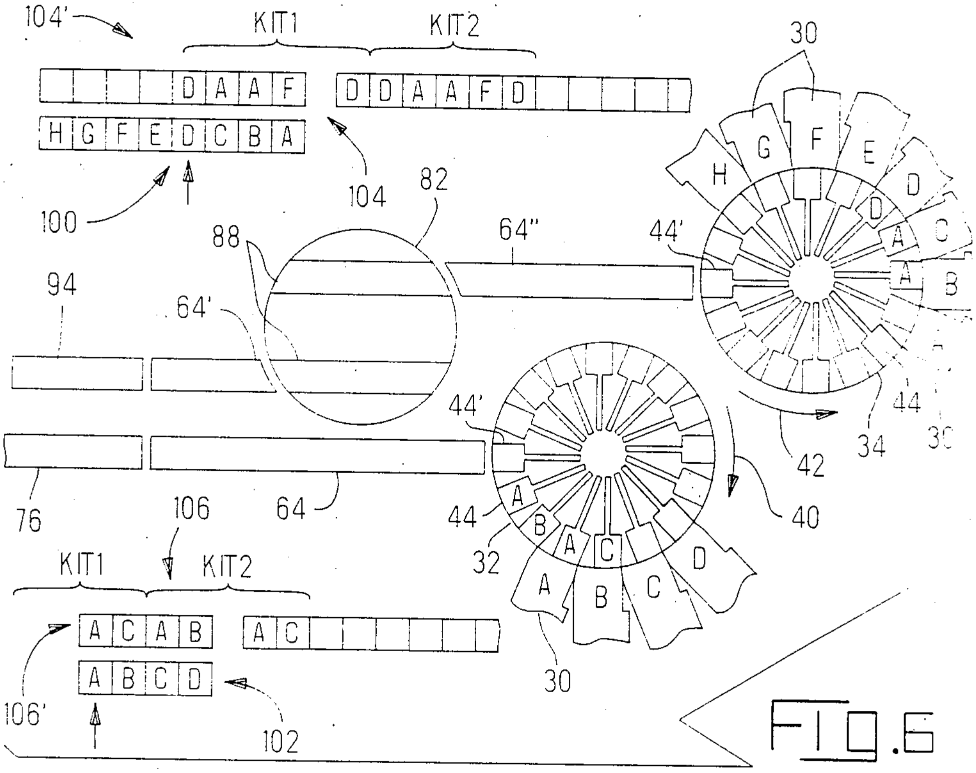
Figure 7:
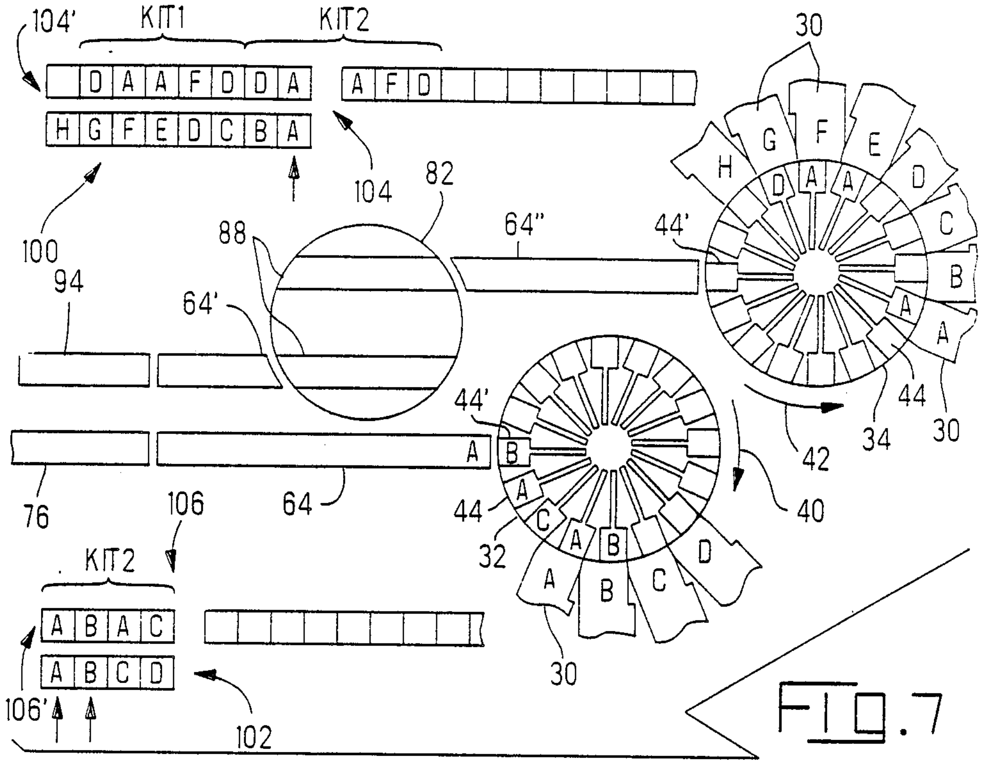
Figure 8:
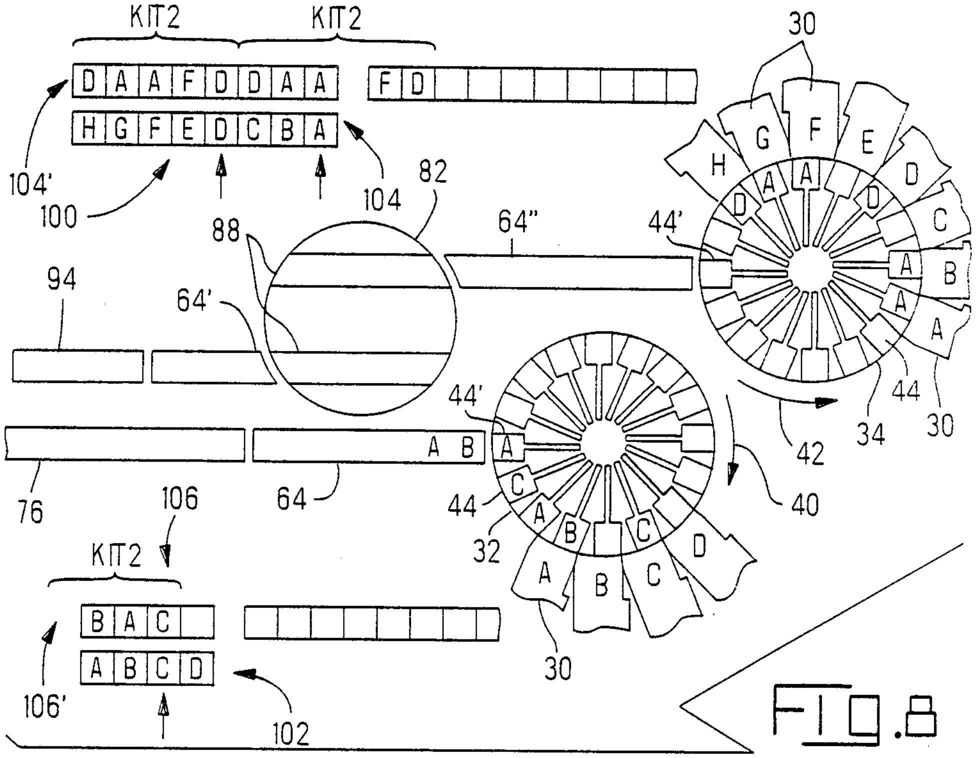
Figure 9:
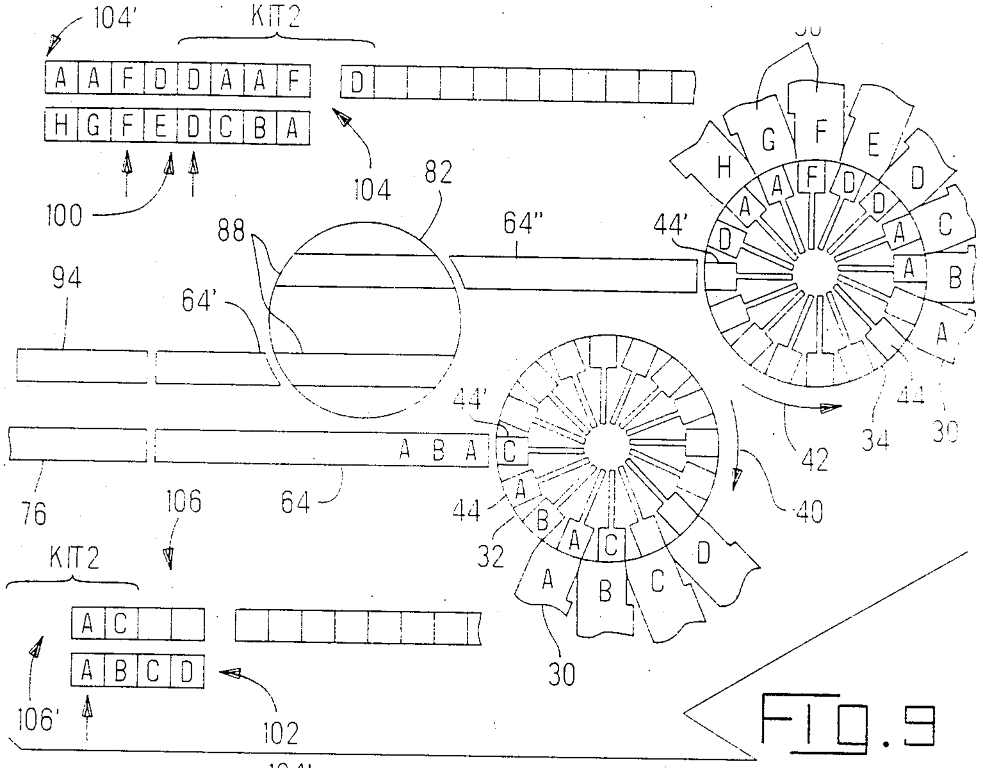
Figure 10:
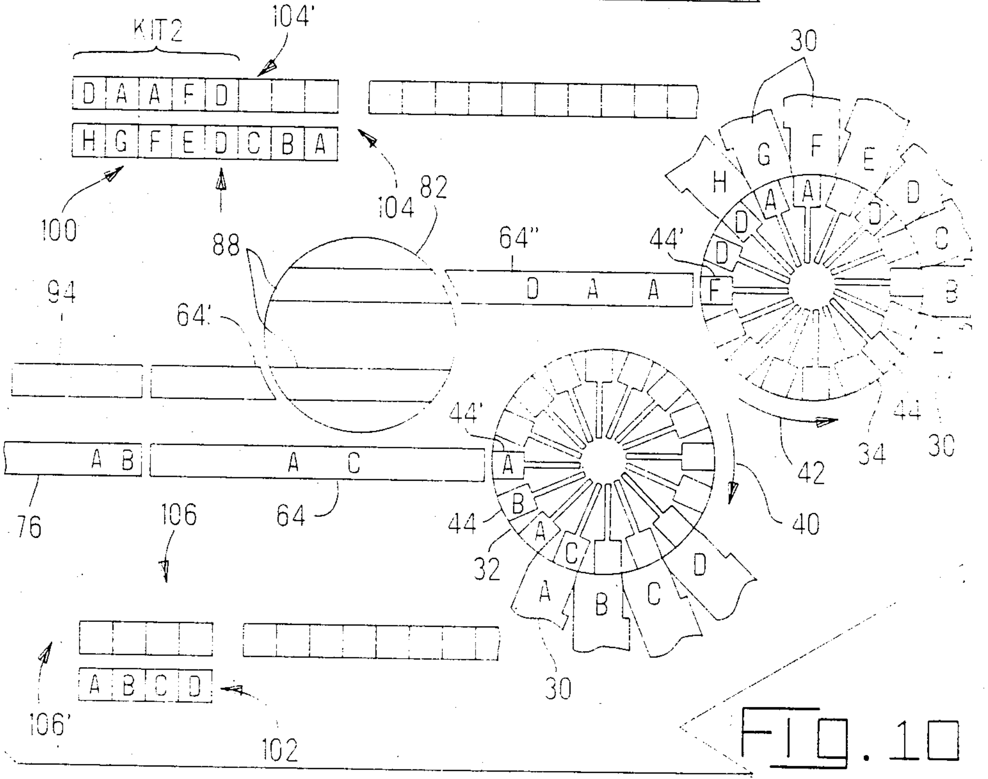

The machine 10 is then cycled again causing the indicators to shift in the shift registers 104 and 106 and the carousels 34 and 32 to index a corresponding number of positions to the position shown in FIG. 6. Note that as the indicators are shifted to the left of the left most position of the shift registers 104' and 106', they are no longer shown. As shown in FIG. 6, the D indicator matches for the trailing end causing a D type connector to be inserted into the carousel 34 and the A indicator matches for the leading end causing an A type connector to be inserted into the carousel 32. This process continues until one of the connectors in a carousel 32, 34 is adjacent the track 64, 64''. Before the carousel is indexed again the computer 24 will cause the appropriate connector take-off module 60 or 80 to move the connector from the connector receiving unit 44' to the track 64, 64''. In the present example, the first A connector in the carousel 32 is moved to the track 64 as shown in FIG. 7.

Figure 11:
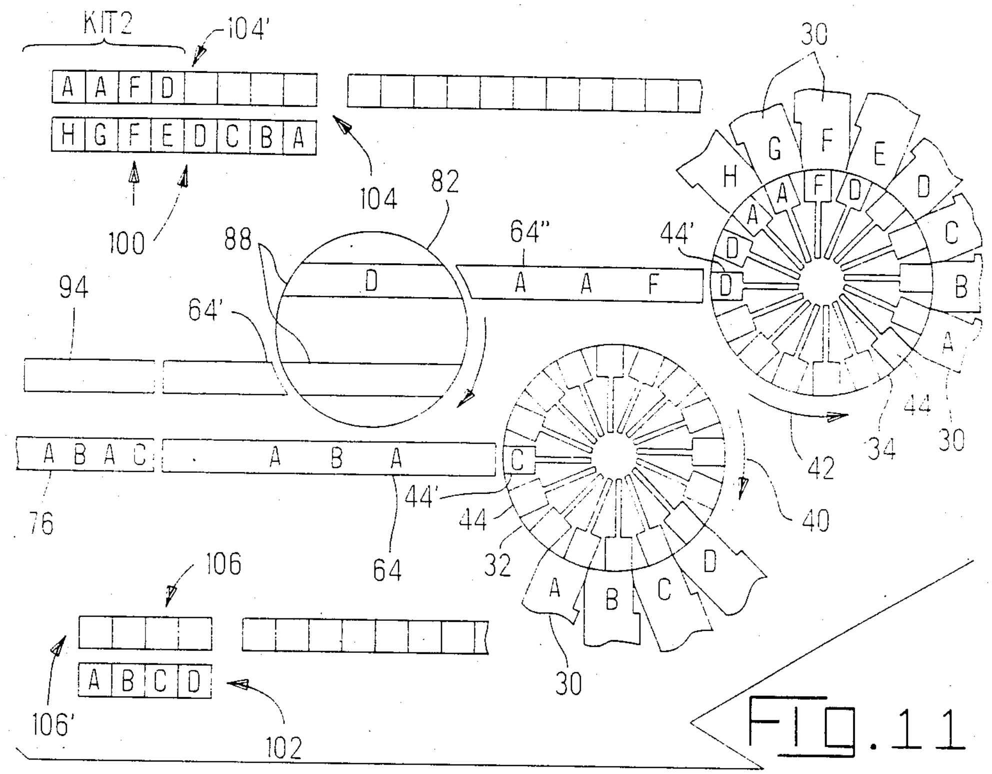
Figure 12:
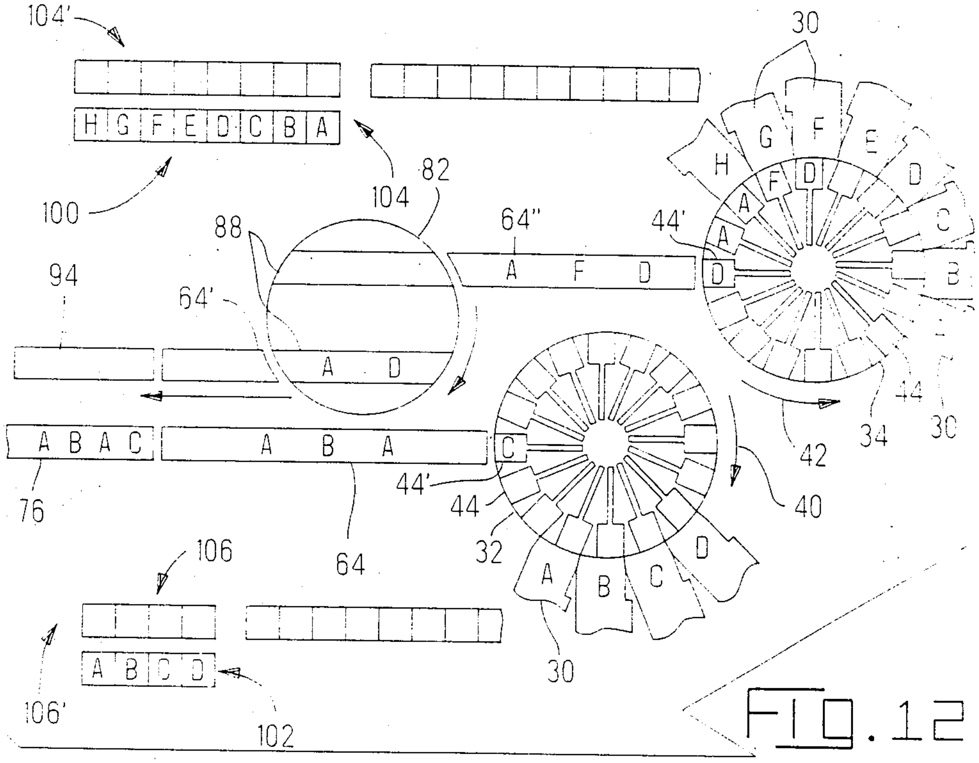
Figure 15:
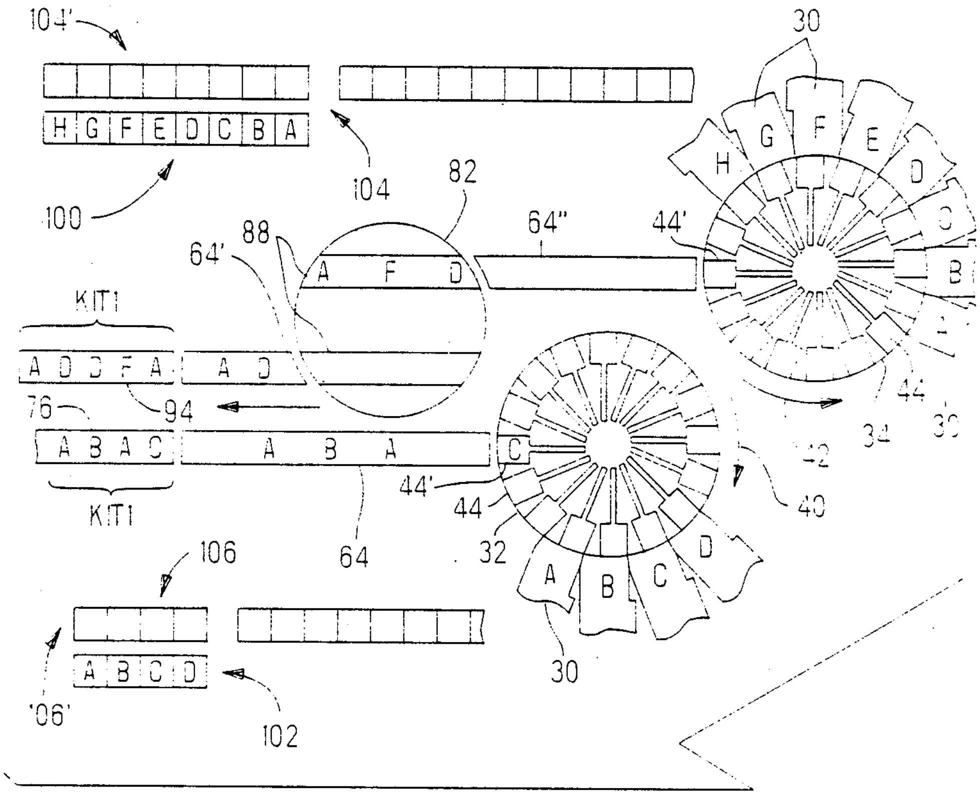

This cycling of the machine 10 continues as shown in FIGS. 8 through 15 until all of the connectors of one kit have been moved through the tracks 64 and 64'' and into the staging modules 76 and 94 respectively. As set forth above, a turntable 82 is provided between the tracks 64' and 64'' to turn the trailing end connectors 46 180 degrees so that they will be properly oriented for termination to the trailing end of the cable. As connectors 46 are continually fed into the track 64'', they are passed into the upper track 88 of the turntable 82 as shown in FIG. 11. When all of the connectors for a single connector are in the upper track 88, the turntable is caused to rotate 180 degrees by the computer 24 to the position shown in FIG. 12 wherein the upper and lower tracks 88 reverse positions. The connectors 46 are now contained in the lower track 88 in correct order for termination to the trailing end of the cable. At this point as additional connectors are moved from the track 64'' into the upper track 88, the connectors in the lower track 88 are moved into the track 64' as shown in FIG. 13. Concurrently, additional connectors are being moved from the carousel 34 into the track 64'' and are, in turn, moved into the vacant upper track 88. The turntable is then again rotated to reverse the two tracks 88 leaving the upper track empty. The connectors AD are then moved through the track 64' and into the staging module 94 while concurrently the connectors AFD are moved into the upper track 88. The turntable is again rotated and the connectors DFA are moved into the track 64' as the connectors DA are moved from the track 64'' into the upper track 88. This process will continue until there are sufficient connectors in each staging module 76 and 94 to build one kit of cable assemblies, as shown in FIG. 15, or until no more connectors 46 are being fed into the connector receiving units 44. At this point the connector feeding apparatus 12 waits until the machine 10 requires additional connectors and the computer 24 activates the pusher mechanism, not shown, for pushing the connectors 46 into position in the wire terminating station 14 for terminating to the cable. After the machine 10 processes the connectors waiting in the staging modules, the above process resumes.

The above described process may continue for any desired quantity of similar or different kits of cable assemblies. An important advantage of the connector feeding apparatus 12 is that a series of different connectors can be automatically selected, placed in a desired order, and correctly oriented for proper termination to the cable assembly, thus, permitting fabrication of kits, or groups, of similar or dissimilar cable assemblies. Such kits of cable assemblies are important since grouping together of all of the cable assemblies for a single end product promotes economy in the manufacturing and control of inventory of the end product. While the above process is described in terms of feeding connectors, the scope of the invention is intended to cover the feeding of other similar products or the like.

We claim:

1. In an automated machine for making a plurality of different cable assemblies in a preselected order wherein at least two different connectors are utilized, a connector feeding apparatus for automatically selecting and feeding a series of said connectors in ordered relationship corresponding to said preselected order of said cable assemblies, said connector feeding apparatus comprising:

(a) a plurality of connector dispensing units in ordered, spaced relationship, one of said units having connectors contained therein of a first type and another of said units having connectors contained therein of a second type;

(b) conveyer means having a plurality of connector receiving units arranged for relative movement with respect to said dispensing units so that each connector receiving unit periodically dwells at a position of registration with each of said dispensing units;

(c) means for associating said ordered relationship of connectors with said plurality of connector receiving units so that each connector receiving unit that is to receive a connector is identified as to which of said connector types it is to receive; and (d) means for selectively actuating each said dispensing means for moving a connector therefrom into a connector receiving means only when said connector receiving means is in said position of registration with said dispensing means and is identified to receive the type connector contained in said dispensing means, whereby said conveyer means will receive said series of connectors in said ordered relationship in adjacent receiving units.

2. The connector feeding apparatus according to claim 1 wherein said plurality of connector receiving units of said conveyer means are arranged to move along an arcuate path and said connector dispensing units are positioned adjacent said arcuate path.

3. The connector feeding apparatus according to claim 2 wherein said conveyer means includes a circular shaped carousel arranged to rotate on its axis and said plurality of connector receiving units are disposed on said carousel adjacent the periphery thereof in mutually spaced relation corresponding to said spacing of said connector dispensing units.

4. The connector feeding apparatus according to claim 1 wherein said means for associating said desired ordering of connectors with said connector receiving units includes a computer having a memory, said memory containing a first array of character positions having a one to one correspondence with said plurality of connector receiving units, each said character position receiving and storing an indicator which identifies said type of connector to be received by its respective connector receiving unit.

5. The connector feeding apparatus according to claim 4 wherein said memory contains a second array of character positions having a one to one correspondence with said plurality of connector dispensing units, each character position containing an indicator of the type of connector contained in its corresponding connector dispenser unit and said means for selectively actuating each said dispensing unit includes means for aligning a portion of said first array with said second array and for shifting one character position at a time all of the indicators in seriatim contained in said first array into said portion thereof in synchronism with said movement of said conveyer means and during each said dwell position comparing each character position in said portion of said first array with each character position in said second array so that a particular connector dispensing unit is actuated only when its corresponding character position contains an indicator the same as the indicator contained in the compared character position of said portion of the first array and when the connector receiving unit corresponding to the compared character position is in its position of registry with said particular connector dispensing unit.

6. The connector feeding apparatus according to claim 1 including track means for receiving a plurality of connectors of more than one type from said conveyer means in a desired order, said connector receiving units of said conveyer means being arranged for relative movement with respect to said track means so that each said connector receiving unit periodically dwells at an exit position of registration with said track means, and transport means for moving the connector from said connector receiving unit at said exit position of registration into said track means.

7. The connector feeding apparatus according to claim 6 wherein said conveyer means includes first and second carousels, both of which are circular shaped and arranged to rotate on their respective axes wherein some of said plurality of connector receiving units are disposed on each said carousel adjacent the respective peripheries thereof in mutually spaced relation corresponding to said spacing of said connector dispensing units, some of which are adjacent said first carousel and others of which are adjacent said second carousel and said track means includes first and second tr4acks in alignment with the exit position of registration of said first and second carousels respectively.

* * * * *